US012686780B2

(12) United States Patent
Sigmund

(10) Patent No.: US 12,686,780 B2
(45) Date of Patent: Jul. 21, 2026

(54) COMPOSITIONS INCLUDING DICHOTOMOUS COMPOSITE PARTICLES, ARTICLE INCLUDING THE COMPOSITION, AND STRUCTURES HAVING SUPERHYDROPHOBIC, SUPEROLEOPHOBIC, OR OMNIPHOBIC SURFACES

(71) Applicant: University of Florida Research Foundation, Inc., Gainesville, FL (US)

(72) Inventor: Wolfgang M. Sigmund, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1012 days.

(21) Appl. No.: 17/785,495

(22) PCT Filed: Feb. 9, 2021

(86) PCT No.: PCT/US2021/017192
§ 371 (c)(1),
(2) Date: Jun. 15, 2022

(87) PCT Pub. No.: WO2021/163024
PCT Pub. Date: Aug. 19, 2021

(65) Prior Publication Data
US 2023/0013324 A1      Jan. 19, 2023

Related U.S. Application Data

(60) Provisional application No. 63/007,512, filed on Apr. 9, 2020, provisional application No. 62/975,039, filed on Feb. 11, 2020.

(51) Int. Cl.
*C09D 7/40*        (2018.01)
*A61K 9/50*        (2006.01)
(Continued)

(52) U.S. Cl.
CPC ................. *C09D 7/70* (2018.01); *C09D 5/00* (2013.01)

(58) Field of Classification Search
CPC .......... C09D 7/70; C09D 5/00; C09D 5/1681; C09D 7/62; C09D 7/65; C08K 9/08; A61K 9/501; A61K 9/5026; A61K 9/5089
See application file for complete search history.

(56) References Cited

U.S. PATENT DOCUMENTS 5,889,088 A * 3/1999 Kisuno .............. C09B 67/0013
                                                            428/407
6,491,903 B1 12/2002 Forster et al.
(Continued)

FOREIGN PATENT DOCUMENTS

DE          102010010792 A1 * 9/2011 ............. C09D 7/62
WO    WO-2009061372 A1 * 5/2009 ............. C09K 23/16

OTHER PUBLICATIONS

Machine English translation of Oleschko Kirsten, DE-102010010792-A1, Sep. 15, 2011. (Year: 2011).*
(Continued)

*Primary Examiner* — Coris Fung
*Assistant Examiner* — Caroline D. Liott
(74) *Attorney, Agent, or Firm* — Thomas Horstemeyer LLP

(57)              ABSTRACT
The present disclosure provides for compositions, articles including the composition, and articles and structures having a superhydrophobic, a superoleophobic, or an omniphobic surface after disposing the composition onto a surface of the article or structure. In general, the composition includes a fluid and a plurality of composite particles having a hydrophilic core and hydrophobic agents on the surface of the hydrophilic core. The composition can be processed so that
(Continued)

the composite particles are dispersible in water, while generating a superhydrophobic, superoleophobic, or omniphobic surface upon application.

8 Claims, 1 Drawing Sheet

(51) Int. Cl.

| | | |
|---|---|---|
| *C09D 5/00* | (2006.01) | |
| *C09D 7/62* | (2018.01) | |
| *C09D 7/65* | (2018.01) | |
| *C08K 9/08* | (2006.01) | |

(56) References Cited

U.S. PATENT DOCUMENTS

| | | |
|---|---|---|
| 6,673,451 B2 | 1/2004 | Bardman et al. |
| 7,081,450 B2 | 7/2006 | Goldshtein |
| 9,227,221 B2 | 1/2016 | Calle et al. |
| 9,528,022 B2 | 12/2016 | Sikka et al. |
| 2011/0263751 A1* | 10/2011 | Mayer ..................... C09D 7/62 |
| | | 524/588 |
| 2014/0308330 A1 | 10/2014 | Santra et al. |
| 2017/0260615 A1* | 9/2017 | Venema ................ C09C 1/3081 |
| 2017/0319458 A1* | 11/2017 | Matsufuji ............ A61K 8/8152 |
| 2018/0057692 A1* | 3/2018 | Williams ................ C09D 7/20 |

OTHER PUBLICATIONS

Woodward, "Aerosol Cans," Jan. 31, 2025, pp. 1-12, https://www.explainthatstuff.com/aerosolcans.html. (Year: 2025).*

Yan et al, "Raspberry-like patchy particles achieved by decorating carboxylated polystyrene cores with snowman-like pol(vinylidene fluoride)/poly(4-vinylpyridiene) Janus particles," 2017, Polymer, 122, pp. 139-147. (Year: 2017).*

Li et al, "Self-stratification of amphiphilic Janus particles at locating surfaces," 2020, Material Horizons, vol. 7 No. 8, pp. 1923-2155 with Supplementary Information, pp. 1-20. (Year: 2020).*

Wang et al, "Janus particles with tunable shapes prepared by asymmetric bottlebrush block copolymers," 2019, Polymer Chem., 10, 372-378. (Year: 2019).*

ISR mailed Apr. 28, 2021, International Application No. PCT/US21/17192, pp. 1-18.

* cited by examiner

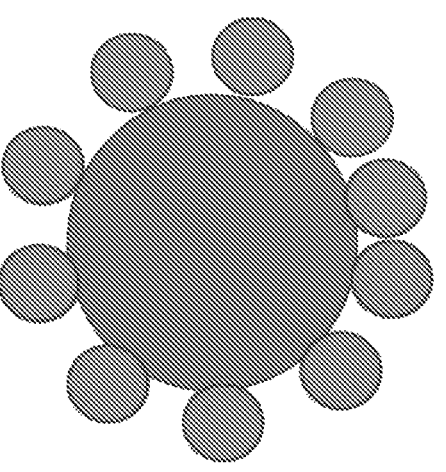

COMPOSITIONS INCLUDING DICHOTOMOUS COMPOSITE PARTICLES, ARTICLE INCLUDING THE COMPOSITION, AND STRUCTURES HAVING SUPERHYDROPHOBIC, SUPEROLEOPHOBIC, OR OMNIPHOBIC SURFACES

CLAIM OF PRIORITY TO RELATED APPLICATION

This application is the 35 U.S.C. § 371 national stage of PCT application having serial number PCT/US2021/017192, filed on Feb. 9, 2021. This PCT application having serial number PCT/US2021/017192 claims priority to U.S. provisional application entitled "COMPOSITIONS INCLUDING DICHOTOMOUS COMPOSITE PARTICLES, ARTICLE INCLUDING THE COMPOSITION, AND STRUCTURES HAVING SUPERHYDROPHOBIC, SUPEROLEOPHOBIC, OR OMNIPHOBIC SURFACES" having Ser. No. 62/975,039 filed on Feb. 11, 2020, which is entirely incorporated herein by reference. In addition PCT application having serial number PCT/US2021/017192 claims priority to U.S. provisional application entitled "Odin or dichotomous particles for aqueous superhydrophobic, superoleophobic, or omniphobic coatings via paint" having Ser. No. 63/007,512 filed on Apr. 9, 2020, which is entirely incorporated herein by reference.

BACKGROUND

Hydrophobic materials, i.e., materials that have a contact angle of water in air above 90 degrees, cannot be wet by water. However, when air is removed, water is forced to wet the surface. This makes the processing of hydrophobic materials in water such as paints very difficult. Typically soaps, detergents or wetting agents are added to allow wetting of such surfaces while air is present. However, the non-wetting property of such surfaces is thus lost.

In order to further advance the contact angle of water in air, superhydrophobic surfaces have been developed and described in many different ways. Such surfaces repel water above 150 degrees in air while some are perfect and repel water at 180 degrees, i.e., perfect spheres (not considering the deformation of a liquid droplet due to gravity). Such droplets have no attractive interaction with the surface, i.e., droplets roll off with the slightest amount of energy of impact or angle of the surface off from the horizontal. When the water droplets roll off, they pick up any dust, dirt or small debris that is on the surface and put it in their droplet surface to minimize its surface energy. Thus, a self-cleaning effect is achieved.

The challenge to date is to make superhydrophobic paint without the use of VOC in the paint product. Typically, organic hydrophobic solvents must be used in paints. This means that such paints have limited use indoors or in some states. Thus, there are still challenges that need to be addressed and overcome.

SUMMARY

The present disclosure provides for compositions, articles including the composition, and articles and structures having a superhydrophobic, a superoleophobic, or an omniphobic surface after disposing the composition onto a surface of the article or structure.

In as aspect, the present disclosure provides for a composition, comprising a fluid and a plurality of composite particles, wherein the composite particle has a hydrophilic core, where the core has a plurality of hydrophobic agents attached thereto, wherein under condition A, the plurality of composite particles are hydrophobic and are suspended in the fluid, wherein under condition B, the plurality of composite particles are hydrophilic and are dispersed in the fluid. In an aspect, condition B has the composition at a first pressure (e.g., about 0.1 to 0.5 ATM) so that the composition is at a pressure less than 1 ATM and the plurality of composite particles are hydrophilic and are dispersed in the fluid. In an aspect, condition B has the composition at a second pressure (e.g., about 2 to 40 ATM) so that the composition is at a pressure greater than 1 ATM and the plurality of composite particles are hydrophilic and are dispersed in the fluid. In an aspect, condition B is where the composition has been subject to ultrasound and the plurality of composite particles are hydrophilic and are dispersed in the fluid and condition A is where the composition has not been subject to ultrasound and the plurality of composite particles are hydrophobic and are suspended in the fluid. In one aspect, the fluid is paint. In an aspect, the composition is in a container.

In another aspect, the present disclosure provides for an article, comprising a composition disposed within a container, wherein the composition includes a fluid and a plurality of composite particles, wherein the composite particle has a hydrophilic core, where the core has a plurality of hydrophobic agents attached thereto, wherein under condition A, the plurality of composite particles are hydrophobic and are suspended in the fluid, wherein under condition B, the plurality of composite particles are hydrophilic and are dispersed in the fluid. In an aspect, the fluid is a water-based paint.

In another aspect, the present disclosure provides for a method of forming a superhydrophobic, superoleophobic, or omniphobic surface, comprising: disposing the composition as described above or herein onto a surface; allowing the composition to dry to form a superhydrophobic, a superoleophobic, or an omniphobic surface.

In yet another aspect, the present disclosure provides for an article or structure comprising a superhydrophobic, a superoleophobic, or an omniphobic surface, wherein the surface comprising a composition including a fluid and a plurality of composite particles, wherein the composite particle has a hydrophilic core, where the core has a plurality of hydrophobic agents attached thereto, optionally wherein the fluid is water-based paint.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1 illustrates a dichotomous composite particle (Odin particle). The core is a particle (e.g., it can be any shape, any density, any porosity, any material) that is hydrophilic on the surface. On this surface the particles (e.g., any shape, any density, any porosity, any material, and any process to make or attach the particles) are attached either randomly or in an organized manner. The attachment may be mechanical, physical bonds such as van der Waals or hydrophobic or chemically bonding.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Aspects of the present disclosure provide for compositions, articles including the composition, and articles and structures having a superhydrophobic, a superoleophobic, or an omniphobic surface after disposing the composition onto a surface of the article or structure. In general, the composition includes a fluid and a plurality of composite particles (also referred to as "dichotomous composite particle") having a hydrophilic core and hydrophobic agents on the surface of the hydrophilic core. The composition can be processed so that the composite particles are dispersible in water, while generating a superhydrophobic, superoleophobic, or omniphobic surface upon application. In a particular embodiment, the fluid can be a water-based paint that includes the composite particles, where the composite particles are dispersed in the water-based paint under certain conditions and upon application to a surface and drying, the surface coated with the composition is superhydrophobic, superoleophobic, or omniphobic.

A superhydrophobic surface is a highly hydrophobic and difficult to wet, where the contact angle of a water droplet is greater than 150° and the roll off angle is less than 2°. A superoleophobic surface is a highly oleophobic and difficult to wet with oil, where the contact angle of an oil droplet is greater than 150°. An omniphobic surface is a highly omniphobic and difficult to wet with any liquid, where the contact angle of a liquid droplet is greater than 150°.

The following is a general description of the composite particles, which will be followed by additional details regarding the composite particles, composition, articles and structures. FIG. 1 illustrates a composite particle (sometimes called "an Odin particle") that is a composite particle that has two counterpoint features. The center or core of the particle is a hydrophilic compound that can be solid or porous (organic or inorganic material). The surface of the core is decorated (chemically and/or physically bonded) with hydrophobic agents (e.g., generally of smaller size, typically radii of about $\frac{1}{4}^{th}$ of the core particle or smaller). In an aspect, the agents may be grown on the surface via sol-gel processing followed by hydrophobizing. In an aspect, the hydrophobic agents may be attached via adsorbed polymers on the core that also bond to the hydrophobic agents. Although depicted as spherical, the core and the surface particles can independently be of any shape (e.g., spherical, irregular, spongy (porous), dendritic, polygonal, rod-like). Existing pigments can be used as well as existing filler compounds of paint.

Under atmospheric conditions and higher air pressures (about 1 ATM and above) in the presence of air, the particles themselves are superhydrophobic, in that water does not penetrate the pores created by the stacking of the hydrophobic particles on top of the core particle. However, a superhydrophobic structure has a limit to when it fails, i.e., the superhydrophobic breakdown. This can be induced by putting composite particles in a pressure chamber in water while only limited amount of trapped air is present, triggering the dissolution of the surface trapped air into water and thus wetting the composite particle. By adjusting the pH such particles can now be dispersed with electric double layer repulsion combined with stirring or shear-mixing or ultrasound. A second method to achieve superhydrophobic breakdown is to use ultrasound alone, where the ultrasound triggers dissolution of the surface air into water and the composite particles are wetted. Another method to achieve superhydrophobic breakdown is to apply vacuum, where the change in pressure triggers dissolution of the surface air into water and the composite particles are wetted. Once particles are in water and fully wetted the repulsive forces from the electric double layer will keep them dispersed. The dispersion stability can be calculated with the DLVO theory or extended DLVO theory. Furthermore, polymers (e.g., polyethylene imine, poly acrylates and other water-soluble polyelectrolytes (cationic or anionic) with low molecular weight (under 50,000 Dalton, preferably under 10,000 Dalton and best under 5,000 Dalton) may be added to assist in dispersion to achieve either a mixed state of dispersion (electrosteric) or purely steric. In addition, nonionic polymers such as polyethylene glycol may also be used, i.e., acting purely steric.

Now having described the composite particle in general, additional details will be provided. As described generally above, the composition of the fluid (e.g., a water-based paint) and the plurality of composite particles, where the composite particle has a hydrophilic core and where the core has a plurality of hydrophobic agents attached to the surface.

The fluid is an aqueous fluid and can include a water-based paint, which generally includes a colorant(s) (e.g., pigment), binder(s) and crosslinker(s) with water used as the carrier. Other components can be used in the water-based paint to improve characteristics (e.g., preservation, anti-mildew, UV protections, and the like) of the water-based paint. The composition can be added to the fluid (e.g., water-based paint). The ratio of the fluid to the composition can be about 40 vol % to 80 vol % or preferably about 45 vol % to 55 vol %.

The term "attached" can include "bind" or "bound", which can refer to, but is not limited to, chemically bonded (e.g., covalently or ionically), biologically bonded, bio-chemically bonded, physically bonded, and/or otherwise associated with the material. In an embodiment, being bound can include, but is not limited to, a covalent bond, a non-covalent bond, an ionic bond, a chelated bond, as well as being bound through interactions such as, but not limited to, hydrophobic interactions, hydrophilic interactions, charge-charge interactions, $\pi$-$\pi$ stacking interactions, combinations thereof, and like interactions. In an embodiment the composite particle can include a linker compound so that so that the hydrophobic core can attach to the hydrophilic agents.

The hydrophilic core can be a solid core or a porous core having a hydrophilic surface. In regard to the porous core, porous means that the particle has open and closed pores that reduce its density. Porous particles may have about 50 vol % of solid and about 50 vol % air while they are still mechanically stable. A porosity of about (e.g., equal to and/or greater than) 0 vol % to about 50 vol % can be used. Pores can be regular or irregular in shape and come with a variety of sizes, with diameters typically not exceeding $\frac{1}{20}^{th}$ of the diameter of the particle core. The hydrophilic core can be a hydrophilic polymer (e.g., crosslinked PVA or latex or combinations thereof), a hydrophilic ceramic (e.g., titania, ZnO, or silica, or combinations thereof), a hydrophilic metal (e.g., gold, silver, copper, and combinations thereof), combinations thereof or materials having similar characteristics. The hydrophilic core can be of any shape such as spherical, polygonal, irregular, spongy (porous), dendritic, polygonal, rod-like and the like. The longest dimension (e.g., diameter, length, etc.) can be about 100 nm to 50 micrometer or preferably about 100 nm to 3 micrometers.

The hydrophobic particle can be of any shape such as spherical, polygonal, irregular, spongy (e.g., porous), dendritic, polygonal, rod-like and the like. The longest dimension (e.g., diameter, length, etc.) can be about 100 nm to 50 micrometer or preferably 100 nm to 3 micrometers.

The hydrophobic agent can be a particle or a chemical compound (e.g., polymer). The hydrophobic agent can be a hydrophobic polymer (e.g., polydimethylsiloxane or poly-vinyl fluoride, polyurethane, polypropylene, polyethylene, or combinations thereof), a hydrophobized ceramic (e.g., hydrophobized titania, hydrophobized ZnO, or hydrophobized versions of silica, clay, bentonite, and silicon carbide, or combinations thereof), or a combination can be attached to the hydrophilic core. The hydrophobic agent can be of any shape such as spherical, polygonal, irregular, spongy (e.g., porous), dendritic, polygonal, rod-like and the like. The longest dimension (e.g., diameter, length, etc.) can be about 5 nm to 300 nm or about 5 nm to 50 nm. In an aspect, the longest dimension is about $\frac{1}{4}$ the longest dimension of the hydrophilic core.

In regard to the composite particle, the longest dimension (e.g., diameter, length, etc.) can be about 110 nm to 50 micrometer or about 110 nm to 3.1 micrometer.

The composite particles, under normal conditions, are hydrophobic due to the hydrophobic agents on the surface of the composite particle. However, the composite particles can be under a set of conditions or processed so that the composite particles can be dispersed in an aqueous fluid, such as a water-based paint. In this regard, under condition A, the composite particles are hydrophobic and are not suspended in the fluid. In other words, the composite particles have the characteristic that under condition A the composite particles are hydrophobic and are not suspended in the fluid. Under condition B, the composite particles are hydrophilic and are dispersed in the fluid. In other words, the composite particles have the characteristic that they are hydrophilic and dispersed in the fluid under condition B.

Typically, when the composite particles are made, they are under condition A and are floating on top of the aqueous fluid. In order to transition them into condition B, i.e., they are suspended (dispersed) in the fluid, the dichotomous composite particles together with the fluid are subjected to a change in pressure and/or to an application of ultrasound. In this regard, condition B can be that the composition is at a first pressure such as a pressure less than 1 ATM, the first pressure is about 0.1 to 0.5 ATM and the plurality of composite particles are hydrophilic and are dispersed in the fluid. Alternatively, condition B can be that the composition is at a second pressure with the composite particles floating on top of the fluid with only small amount of air in a pressure vessel, so that the composition can be compressed at a pressure greater than 1 ATM (e.g., about 2 ATM to 40 ATM) so that the plurality of composite particles are hydrophilic and are dispersed in the fluid. In addition, condition B can be that the composition has been subjected to ultrasound using either an ultrasonic bath or an ultrasonic horn with sound frequencies from 20 to 40 kHz (preferably 40 kHz). The ultrasound creates cavitation bubbles that dissolve the air trapped in the pores on the composite particle surface and furthermore pushes the air out of the fluid into the environment and thus the plurality of composite particles are hydrophilic and are dispersed in the fluid. In an embodiment, condition B is a combination of a higher or lower pressure (as compared to 1 ATM) and has been subject to ultrasound and the plurality of composite particles are hydrophilic and are dispersed in the fluid. Once dispersed in the fluid, a chemical can be added to the composition or a condition can be changed so that the composite particles remain dispersed in the fluid until sprayed or applied in any other way.

While in some embodiments all or substantially all (about 95% or more) of the composite particles are dispersed in composition, it is contemplated that only a portion of the composite particles are dispersed in the composition. In this regard, the ratio of the plurality of composite particles that are hydrophobic and are suspended in the fluid as compared to the plurality of composite particles that are hydrophilic and are dispersed in the fluid is about 25:75 to about 75:25.

The composition can be disposed into an article, such as a container (e.g., spray container) used to dispose (e.g., spray) the composition onto a surface of another article or structure. For example, the composition can be included in a spray container (e.g., hand-held container, industrial spray system, or the like). In particular, the composition can be a water-based paint that is in a spray can. As discussed above, the composition is naturally at condition A, so the composition can be put into the article (e.g., container) at condition A and prior to application (e.g., spraying) of the composition, the pressure can be changed to put into condition B so that the composite particles are dispersed in the fluid. The pressure can be changed by shaking the container or though some other mechanism (chemical or physical) so that the pressure increases or decreases to a degree to move from condition A to condition B. In an embodiment, the composition can be disposed into the container in condition B and kept at an elevated pressure or under a vacuum and/or the composition was subject to ultrasound prior to being disposed in the container. Also, one or more chemicals can be added to keep the composition in condition B or a characteristic (e.g., pH) of the composition can be adjusted to keep the composition in condition B.

The container including the composition can be disposed onto a surface of an article (e.g., toy, furniture, outdoor structure (e.g., fence, table, sign), or the like) or structure (e.g., wall or ceiling of a house or building, a surface in an aircraft or watercraft, a surface in a container to store a chemical, a surface of a reactor, or the like). Depending on the condition of the composition, the composition can be immediately disposed (e.g., sprayed) onto the surface or the article can be handled in a way to promote the change in condition A to condition B and then disposed onto the surface. After the composition dries (e.g., the water evaporates), the surface can have a superhydrophobic, superoleophobic, or omniphobic characteristic.

Examples for Composite Particle Materials Include:

Crosslinked polyvinyl alcohol (PVA) or latex as core (a hydrophilic polymer that does not dissolve in water) and polydimethylsiloxane or polyvinyl fluoride (a hydrophobic polymer) as decorating particle.

A ceramic such as titania, ZnO, or silica as core and a hydrophobic polymer such as polydimethylsiloxane or polyvinyl fluoride as decorating particle.

Titania, ZnO, or silica (any ceramic material) as core and silica or other ceramic that is hydrophobized as decorating particle.

Gold, silver, copper (a metal that does not corrode in water) as core decorated with any organic or inorganic hydrophobized or hydrophobic particle.

The invention claimed is:

1. A composition, comprising a fluid and a plurality of composite particles, wherein the composite particle has a hydrophilic core, where the core has a plurality of hydrophobic agents attached thereto, wherein under condition A, the plurality of composite particles are hydrophobic and are suspended in the fluid, wherein under condition B, the plurality of composite particles are hydrophilic and are dispersed in the fluid, wherein the hydrophilic core is a hydrophilic polymer, wherein the hydrophilic polymer is a crosslinked polyvinyl alcohol (PVA) or latex, and wherein the hydrophobic agent is a hydrophobic polymer, wherein the hydrophobic polymer is polydimethylsiloxane or polyvinyl fluoride.

2. The composition of claim 1, wherein condition B has the composition at a first pressure so that the composition is at a pressure less than 1 ATM and the plurality of composite particles are hydrophilic and are dispersed in the fluid.

3. The composition of claim 2, wherein the first pressure is about 0.1 to 0.5 ATM.

4. The composition of claim 1, wherein condition B has the composition at a second pressure so that the composition is at a pressure greater than 1 ATM and the plurality of composite particles are hydrophilic and are dispersed in the fluid.

5. The composition of claim 4, wherein the second pressure is about 2 to 40 ATM.

6. The composition of claim 1, wherein condition B is where the composition has been subject to ultrasound and the plurality of composite particles are hydrophilic and are dispersed in the fluid.

7. The composition of claim 1, wherein condition A is where the composition has not been subject to ultrasound and the plurality of composite particles are hydrophobic and are suspended in the fluid.

8. The composition of claim 1, wherein the fluid is paint.

* * * * *